United States Patent

Kanai et al.

Patent Number: 5,245,462
Date of Patent: Sep. 14, 1993

[54] LASER BEAM SCANNING APPARATUS

[75] Inventors: Nobuo Kanai, Toyohashi; Toshikazu Kawaguchi, Toyokawa; Satoru Yoneda, Machida, all of Japan

[73] Assignee: Minolta Camera Kabushiki Kaisha, Osaka, Japan

[21] Appl. No.: 977,599

[22] Filed: Nov. 17, 1992

[30] Foreign Application Priority Data

Nov. 18, 1991 [JP] Japan .................. 3-301805

[51] Int. Cl.⁵ ............................. G02B 26/08
[52] U.S. Cl. ............................. 359/204; 359/206; 359/216; 250/578.1
[58] Field of Search ............................. 359/204–206, 359/216–219, 710–711, 662; 250/578.1; 346/108, 160

[56] References Cited

U.S. PATENT DOCUMENTS

| Re. 34,156 | 1/1993 | Morimoto | 359/217 |
| 4,637,679 | 1/1987 | Funato | 359/204 |
| 5,054,866 | 10/1991 | Tomita et al. | 359/206 |
| 5,093,745 | 3/1992 | Kuroda | 359/217 |

FOREIGN PATENT DOCUMENTS 61-028919 2/1986 Japan .

Primary Examiner—Bruce Y. Arnold
Assistant Examiner—James Phan
Attorney, Agent, or Firm—Price, Gess & Ubell

[57] ABSTRACT

A laser beam scanning apparatus having a laser beam generating section generating first and second laser beams, a rotatable polygonal mirror for deflecting the first and second laser beams to form scanning lines each extending in a main scanning direction on a beam receiving surface and an optical system for imaging the first and second laser beams deflected by the polygonal mirror on the beam receiving surface. Each of the first and second laser beams impinges on the reflective face of the polygonal mirror at an angle with respect to an optical axis in a sub-scanning direction perpendicular to the main scanning direction. The following condition is satisfied:

$$|\beta \times \tan\theta a| \leq (5/3) \times Pi$$

$$|\beta \times \tan\theta b| \leq (5/3) \times Pi$$

$$|\theta a| + |\theta b| \geq |\psi a| + |\psi b|$$

where $\beta$ is a magnification of the optical system in the sub-scanning direction, $\theta a$ and $\theta b$ are angles at which the first and second laser beams impinge on the reflective face in the sub-scanning direction, respectively, Pi is a pitch of the scanning lines on the beam receiving surface in the sub-scanning direction, $\psi a$ and $\psi b$ are converging angles of the first and second laser beams impinging on the reflective face in the sub-scanning direction, respectively.

8 Claims, 4 Drawing Sheets

LASER BEAM SCANNING APPARATUS

BACKGROUND OF THE INVENTION

1. Field of the Invention

The present invention relates to laser beam scanning apparatus, and more particularly to a laser beam scanning apparatus for use in laser beam printers, facsimile systems, etc.

2. Description of the Prior Art

Generally in laser beam scanning apparatus, a laser beam emitted from a semiconductor laser is made into a bundle of parallel rays by a collimator lens and thereafter converged by a cylindrical lens to a linear form on a reflecting surface of a polygonal mirror. Upon deflection at the mirror reflecting surface, the laser beam is concentrated on a beam receiving surface by an imaging optical system. The spot of laser beam on the beam receiving surface moves with the rotation of the polygonal mirror, thereby forming a scanning line. In the following description, the direction in which this scanning line extends will be referred to as the "main scanning direction," and a direction orthogonal to the scanning line on the beam receiving surface as the "sub-scanning direction." The beam receiving surface is moved in the sub-scanning direction and exposed to the laser beam two-dimensionally with this movement. The reflecting surface of the polygonal mirror and the beam receiving surface are optically conjugate with respect to the sub-scanning direction. This precludes the deviation of the scanning line due to an inclination of the reflecting surface of the polygonal mirror.

On the other hand, Japanese Laid-Open Patent Application No. 61-28919 discloses a laser beam scanning apparatus having two laser beam generating sources. With the disclosed laser beam apparatus, two laser beams are incident on the reflecting surface of a polygonal mirror each at a predetermined angle in the sub-scanning direction.

However, when the distance from the axis of rotation of the polygonal mirror to its respective reflecting surfaces involves variations in the case where a laser beam is obliquely incident on the reflecting surfaces of the polygonal mirror in the sub-scanning direction, the spot of the laser beam on the beam receiving surface deviates in the sub-scanning direction, consequently giving rise to exposure irregularities periodically.

SUMMARY OF THE INVENTION

Accordingly, the main object of the present invention is to provide a laser beam scanning apparatus which is free of exposure irregularities on the beam receiving surface.

Another object of the invention is to provide a laser beam scanning apparatus which is diminished in variations in the spacing between scanning lines.

Still another object of the invention is to provide a laser beam scanning apparatus wherein even when a laser beam is obliquely incident on deflecting surfaces in the sub-scanning direction, the spot of the laser beam on the beam receiving surface is unlikely to deviate in the sub-scanning direction.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An embodiment of the present invention will be described below with reference to the drawings.

Figure 1:
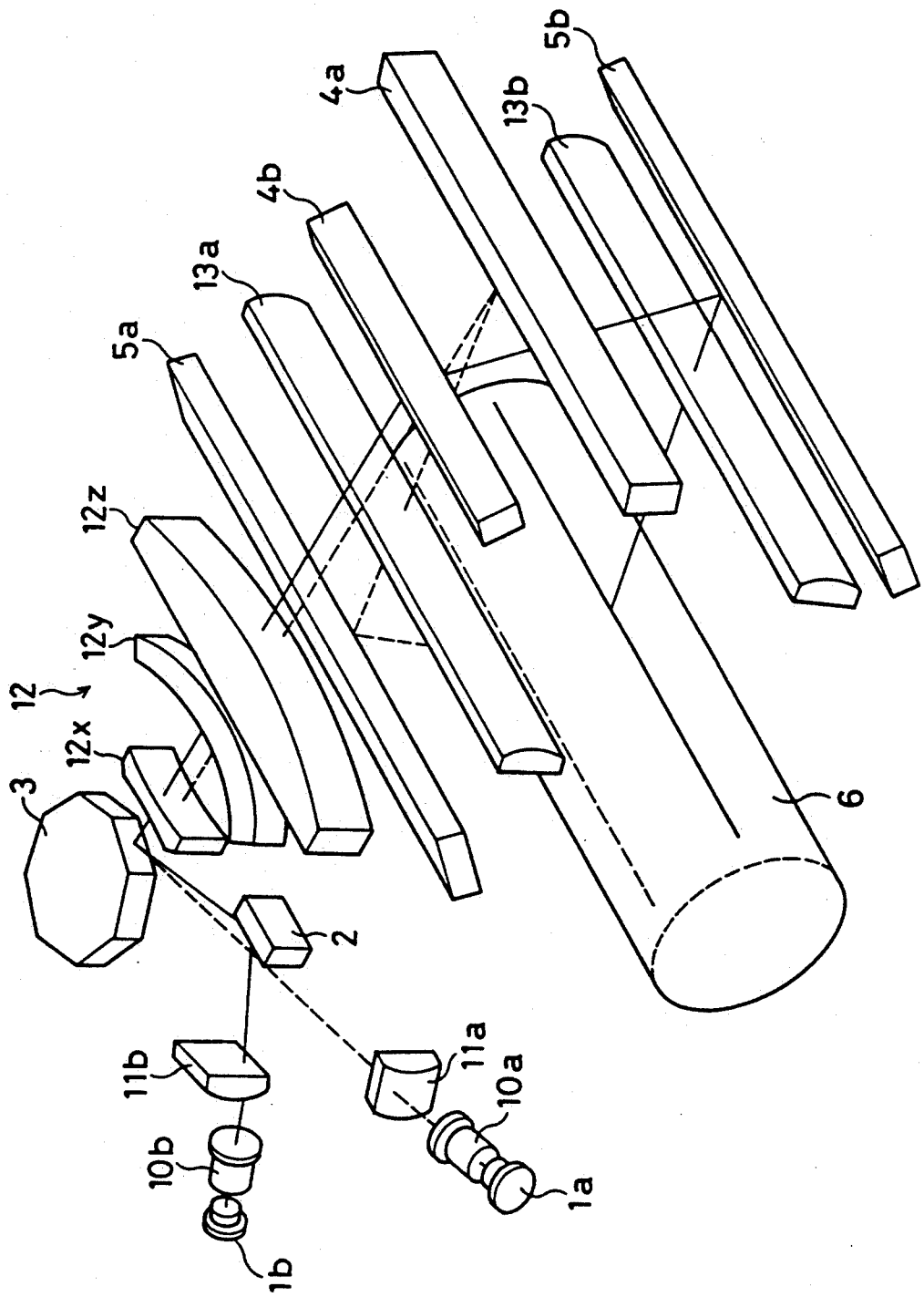
FIG. 1 is a perspective view of a laser beam scanning apparatus embodying the invention.
Figure 2:
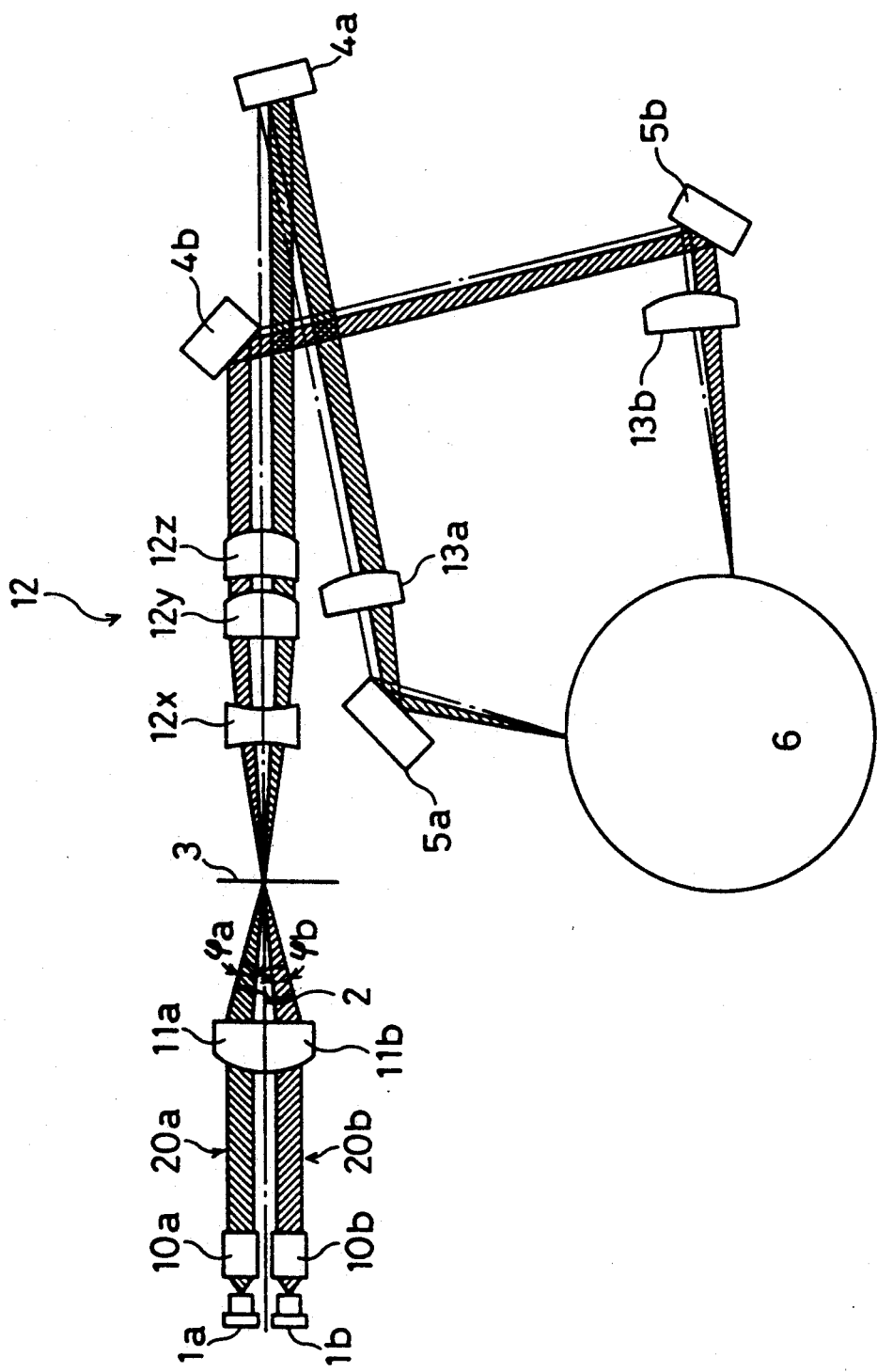
FIG. 2 is a diagram schematically showing the construction of the apparatus of FIG. 1 and optical paths therein as the apparatus is viewed with respect to the sub-scanning direction.
Figure 3:
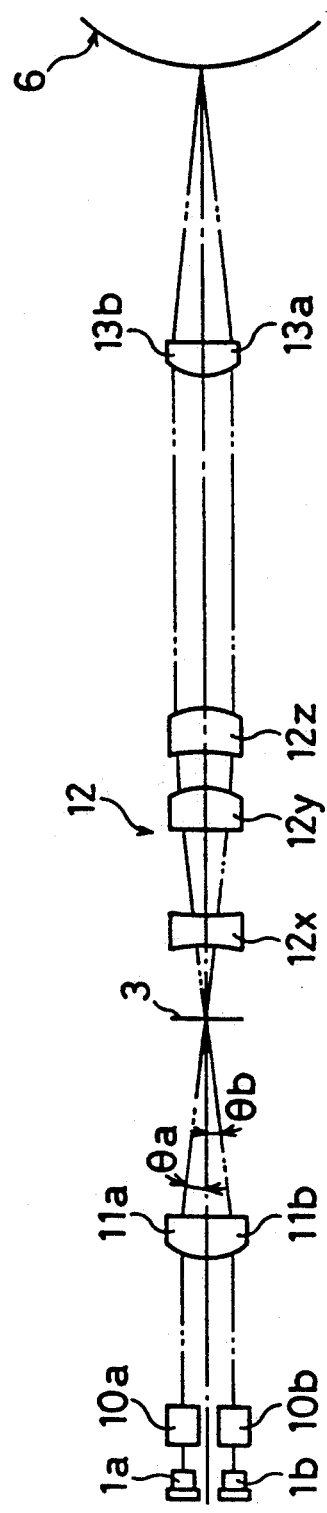
FIG. 3 is a diagram showing the optical paths extending in the sub-scanning direction in the apparatus shown in FIG. 1.

FIGS. 1, 2 and 3 show a laser beam scanning apparatus embodying the invention. The apparatus serves, for example, as a component of electrophotographic printers. The laser beam scanning apparatus has two semiconductor lasers 1a, 1b. These lasers 1a, 1b emit laser beams 20a, 20b, which impinge on different locations on a photosensitive drum 6 having a beam receiving surface. These laser beams 20a, 20b have been modulated in accordance with items of image data corresponding to different colors and form on the drum 6 electrostatic latent images corresponding to the image data. The electrophotographic process using a photosensitive drum is known and therefore will not be described.

The laser beam 20a emitted from the semiconductor laser passes through a collimator lens 10a and a first cylindrical lens 11a. The collimator lens 10a forms the laser beam 20a into a bundle of parallel rays. The first cylindrical lens 11a has power only in the sub-scanning direction to concentrate the laser beam 20a in the vicinity of a reflecting surface of a polygonal mirror 3 with respect to the sub-scanning direction. The laser beam 20a is deflected by the polygonal mirror 3 as deflecting means and directed toward a toric fθ lens 12. The toric fθ lens 12 has different powers with respect to the main scanning direction and the sub-scanning direction, and moves a spot of the laser beam on the photosensitive drum 6 at a substantially constant speed in the main scanning direction. The laser beam 20a passing through the toric fθ lens 12 reaches the drum 6 by way of a first reflecting mirror 4a, a second cylindrical lens 13a having power only in the sub-scanning direction and a second reflecting mirror 5a.

On the other hand, the laser beam 20b emitted from the semiconductor laser 1b, like the beam 20a, is formed into a bundle of parallel rays by a collimator lens 10b and concentrated in the vicinity of the reflecting surface of the polygonal mirror 3 with respect to the sub-scanning direction by a third cylindrical lens 11b. The laser beam 20b passing through the lens 11b is made to coincide with the laser beam 20a with respect to the main scanning direction by being reflected at a combining mirror 2, and is thereafter directed toward the reflecting surface of the polygonal mirror 3. The beam 20a and the beam 20b are incident on the same reflecting surface of the polygonal mirror 3. The laser beam 20b is deflected by the polygonal mirror 3, passes through the toric fθ lens 12 and is reflected at a third reflecting mirror 4b and a fourth reflecting mirror 5b. The laser beam 20b reflected from the fourth reflecting mirror 5b passes through a fourth cylindrical lens 13b having power only in the sub-scanning direction and reaches the photosensitive drum 6.

With reference to FIG. 3, the laser beam 20a, when passing through the first cylindrical lens 11a, passes through a position above the optical axis O and impinges on the polygonal mirror 3 from above the optical axis O at a predetermined angle therewith. Thus, the beam 20a is incident on the reflecting surface of the polygonal mirror 3 obliquely in the sub-scanning direction. The laser beam 20a deflected at the polygonal mirror 3 passes through the toric fθ lens 12 and the second cylindrical lens 13a below the optical axis O. On the other hand, the laser beam 20b passes through the third cylindrical lens 11b below the optical axis O and impinges on the polygonal mirror 3 from below the axis O at a predetermined angle therewith. Thus, the beam 20b is incident on the reflecting surface of the polygonal mirror 3 obliquely in the sub-scanning direction. The laser beam 20b deflected by the polygonal mirror 3 passes through the toric fθ lens 12 and the fourth cylindrical lens 13b above the optical axis O.

To cause the laser beams 20a, 20b to reach the photosensitive drum 6 at different positions, the third reflecting mirror 4b for reflecting the laser beam 20b is disposed above the optical axis O. The laser beam 20a passes below the optical axis and is therefore reflected not by the third reflecting mirror 4b but by the first reflecting mirror 4a.

Furthermore, the vicinity of the reflecting surface of the polygonal mirror 3 and the peripheral surface of the photosensitive drum 6 are optically conjugate with respect to the optical system provided therebetween. This corrects the deviation of the scanning point on the drum 6 due to an inclination of the reflecting surface of the polygonal mirror 3.

With laser beam scanning apparatus wherein the laser beam is made obliquely incident on the reflecting surfaces of the polygonal mirror in the sub-scanning direction, it is likely that the distance from the axis of rotation of the polygonal mirror to the reflecting surfaces will involve errors. The position of the scanning line on the photosensitive drum then differs for different reflecting surfaces. In this case, the spacing between scanning lines becomes no longer uniform, consequently giving rise to exposure irregularities in the sub-scanning direction. Such exposure irregularities appear as variations in the density of images formed on the photosensitive drum. It is generally thought that if the exposure irregularities are up to 10%, there arises no problem as to the quality of images. Accordingly, assuming that the spacing between scanning lines in the sub-scanning direction is Pi (mm), the allowable range of deviations involved in the spacing between scanning lines is up to $(1/10) \times Pi$ (mm). Further errors $\alpha$ in the distance from the axis of rotation of usual polygonal mirrors to the reflecting surfaces thereof are about 30 (μm).

Figure 4:
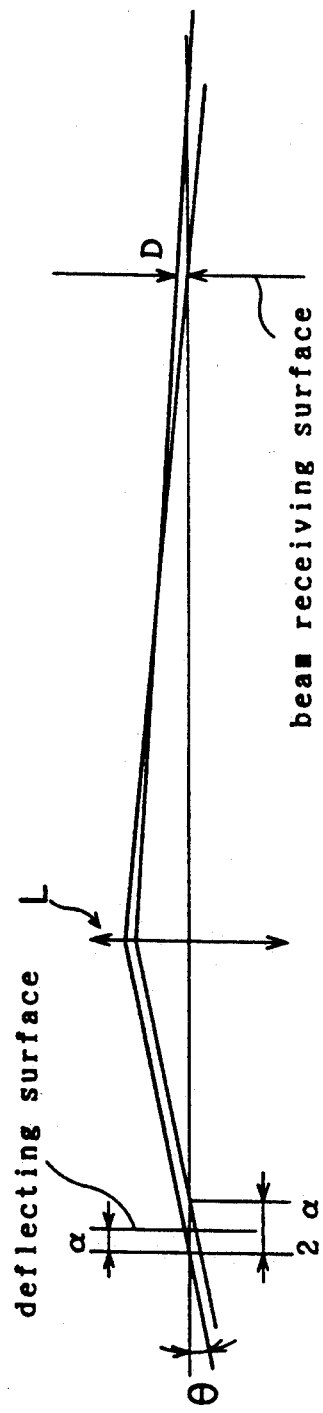
FIG. 4 is a diagram for illustrating a deviation of the scanning line on a beam receiving surface in the case where the distance from the axis of rotation of a polygonal mirror to its respective reflecting surfaces involves variations.

If the error in the distance from the axis of rotation of the polygonal mirror to the reflecting surface thereof is $\alpha$ (mm) as seen in FIG. 4, that is, if the rotation axis deviates by $\alpha$ with respect to the reflecting surface, the deviation of the reflecting surface resulting from one revolution of the polygonal mirror 3 is $2 \times \alpha$ (mm). The deviation D of the scanning line due to the deviation of the reflecting surface is expressed approximately by $$D = 2 \times \alpha \times \beta \times \tan\theta$$

wherein $\beta$ is the magnification of the imaging optical system L (toric fθ lens and cylindrical lens) in the sub-scanning direction, and $\theta$ is the angle at which the laser beam is incident on the reflecting surface (deflecting surface) of the polygonal mirror 3 in the sub-scanning direction.

The following requirement must then be satisfied.

$$|D| \leq (1/10) \times Pi$$

Stated more specifically, $$|2 \times 0.03 \times \beta \times \tan\theta| \leq (1/10) \times Pi$$

$$|\beta \times \tan\theta| \leq (5/3) \times Pi$$

In the case of the apparatus described with reference to FIGS. 1 to 3, two laser beams are used, so that the requirement to be fulfilled by the laser beam 20a is $$|\beta \times \tan\theta a| \leq (5/3) \times Pi$$

Similarly, the requirement to be satisfied by the laser beam 20b is $$|\beta \times \tan\theta b| \leq (5/3) \times Pi$$

In these two expressions, $\theta a$ and $\theta b$ are angles at which the laser beams 20a and 20b are respectively incident on the reflecting surface of the polygonal mirror 3. Further assuming that the converging angles of the laser beams 20a and 20b directed toward the sub-scanning direction to impinge on the polygonal mirror 3 are $\psi a$ and $\psi b$, respectively, as shown in FIG. 2, the requirement for satisfactorily separating the laser beams 20a, 20b are $$(|\theta a| + |\theta b|)/2 \leq (|\psi a| + |\psi b|)/2$$

Accordingly, $$|\theta a| + |\theta b| \leq |\psi a| + |\psi b|$$

If this requirement is not satisfied, one of the laser beams overlaps the other laser beam to produce a ghost.

Although two laser beams are used in the embodiment described, the concept of the present invention is applicable to a case wherein a single laser beam or three or more laser beams are used.

It is also possible to use gas lasers instead of the semiconductor lasers.

The deflecting means used in the embodiment described is a polygonal mirror, whereas the deflecting means is not limited to the mirror but can be a deflecting device having, for example, only one deflecting surface.

Furthermore, laser beam scanning apparatus embodying the present invention are not limited to the type wherein a photosensitive surface is exposed to a laser beam to form an image thereon but can be those adapted to expose a usual document to a laser beam and read an image of the document from the light reflected therefrom.

As will be apparent from the foregoing description, exposure irregularities which would occur periodically can be diminished or precluded by determining the angle at which the laser beam is incident on the deflecting surface in the sub-scanning direction and the magnification of the imaging optical system in the sub-scanning direction, in connection with the spacing between the scanning lines to be formed on the beam receiving surface.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning apparatus comprising:
   laser beam generating means for generating a laser beam;
   deflecting means having a reflective face for deflecting the laser beam generated by said laser beam generating means to form scanning lines each extending in a main scanning direction on a beam receiving surface, the laser beam impinging on the reflective face of said deflecting means is at an angle $\theta$ with respect to an optical axis in a sub-scanning direction perpendicular to said main scanning direction; and
   optical means for imaging the laser beam deflected by said deflecting means on said beam receiving surface,
   wherein the following condition is satisfied:

$$|\beta \times \tan\theta| \leq (5/3) \times Pi$$

where $\beta$ is a magnification of said optical means in the sub-scanning direction and Pi is a pitch of the scanning lines on the beam receiving surface in the sub-scanning direction.

2. A laser beam scanning apparatus as claimed in claim 1, wherein said laser beam generating means includes a semiconductor laser, a collimator and a cylindrical lens.

3. A laser beam scanning apparatus as claimed in claim 1, wherein said deflecting means includes a rotatable polygonal mirror.

4. A laser beam scanning apparatus as claimed in claim 1, wherein said optical means includes a toric f$\theta$ lens and a cylindrical lens.

5. A laser beam scanning apparatus comprising:
   laser beam generating means for generating first and second laser beams;
   deflecting means having a reflective face for deflecting the first and second laser beams generated by said laser beam generating means to form scanning lines each extending in a main scanning direction on a beam receiving surface, each of the first and second laser beams impinging on the reflective face of said deflecting means at an angle with respect to an optical axis in a sub-scanning direction perpendicular to said main scanning direction; and
   optical means for imaging the first and second laser beams deflected by said deflecting means on said beam receiving surface,
   wherein the following condition is satisfied:

$$|\beta \times \tan\theta a| \leq (5/3) \times Pi$$

$$|\beta \times \tan\theta b| \leq (5/3) \times Pi$$

$$|\theta a| + |\theta b| \geq |\psi a| + |\psi b|$$

where $\beta$ is a magnification of said optical means in the sub-scanning direction, $\theta a$ is an angle at which the first laser beam impinges on the reflective face of said deflecting means in the sub-scanning direction, $\theta b$ is an angle at which the second laser beam impinges on the reflective face of said deflecting means in the sub-scanning direction, Pi is a pitch of the scanning lines on the beam receiving surface in the sub-scanning direction, $\psi a$ is a converging angle of the first laser beam impinging on the reflective face of said deflecting means in the sub-scanning direction and $\psi b$ is a converging angle of the second laser beam impinging on the reflective face of said deflecting means in the sub-scanning direction.

6. A laser beam scanning apparatus as claimed in claim 5, wherein said laser beam generating means includes semiconductor lasers, collimators and cylindrical lenses.

7. A laser beam scanning apparatus as claimed in claim 5, wherein said deflecting means includes a rotatable polygonal mirror.

8. A laser beam scanning apparatus as claimed in claim 5, wherein said optical means includes a toric f$\theta$ lens and a cylindrical lens.

* * * * *